United States Patent [19]

Gard et al.

[11] 4,219,089
[45] Aug. 26, 1980

[54] ELECTRONIC COUNTING SCALE

[75] Inventors: Eric A. Gard, Lancaster; James S. Bryan, Harrisburg, both of Pa.

[73] Assignee: Pennsylvania Scale Company, Leola, Pa.

[21] Appl. No.: 950,841

[22] Filed: Oct. 6, 1978

[51] Int. Cl.² .............. G01G 13/14; G01G 19/04; G01G 21/00
[52] U.S. Cl. ................................ 177/165; 177/200; 177/128; 177/25
[58] Field of Search ............... 177/25, 200, 165, 128

[56] References Cited

U.S. PATENT DOCUMENTS

| 3,552,511 | 1/1971 | Marcheso et al. | 177/200 X |
| 4,043,412 | 8/1977 | Rock | 177/200 X |
| 4,139,070 | 2/1979 | Hanson et al. | 177/200 |

Primary Examiner—George H. Miller, Jr.
Attorney, Agent, or Firm—Weingram & Klauber

[57] ABSTRACT

An electronic counting scale, which may comprise a single relatively compact unit including all operable elements; or which may be based upon a modular construction including, firstly, an electronics unit which includes all basic electronic circuitry necessary to operation; and, secondly, a base unit. The base unit in the modular construction, includes the load cell, associated mechanical linkage, the weight receiving platform, and the like. It is adapted to directly receive the electronics unit, and includes connector means for enabling electrical interconnection with the electronics unit, and means for mechanically coupling the base unit to the electronics unit. The load cell is a parallelogram-type flexure frame, and is characterized by four strain gauges, which are located at the upper and lower surfaces of two vertically overlying flexure corners of the parallelogram. This arrangement—because of symmetry considerations—is uniquely free of second-order errors generated by offset loading. At the same time, the arrangement provides two corners completely free of strain gauges, providing sites which can be trimmed by filing or so forth to compensate for small symmetry errors present in the load cell as originally fabricated and assembled. Suitable electronic circuitry is provided to enable the counting function, including to enable updating of the stored weight per unit value for the articles in the sample group, and for auto-zero tracking to correct for drift in the circuitry.

12 Claims, 11 Drawing Figures

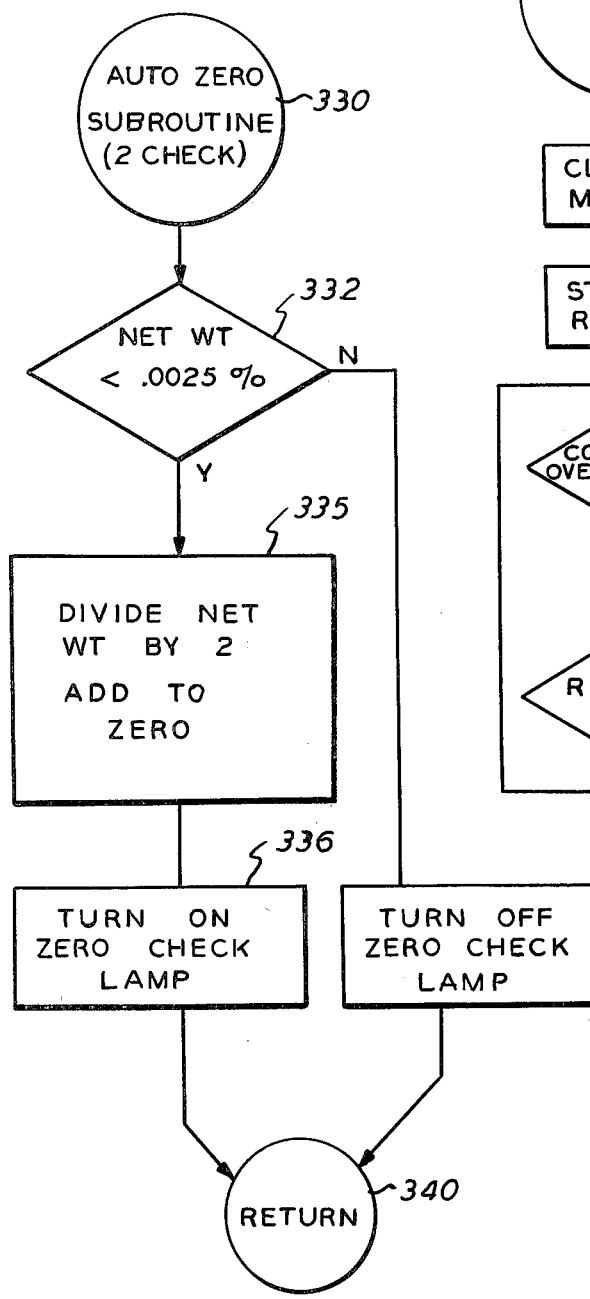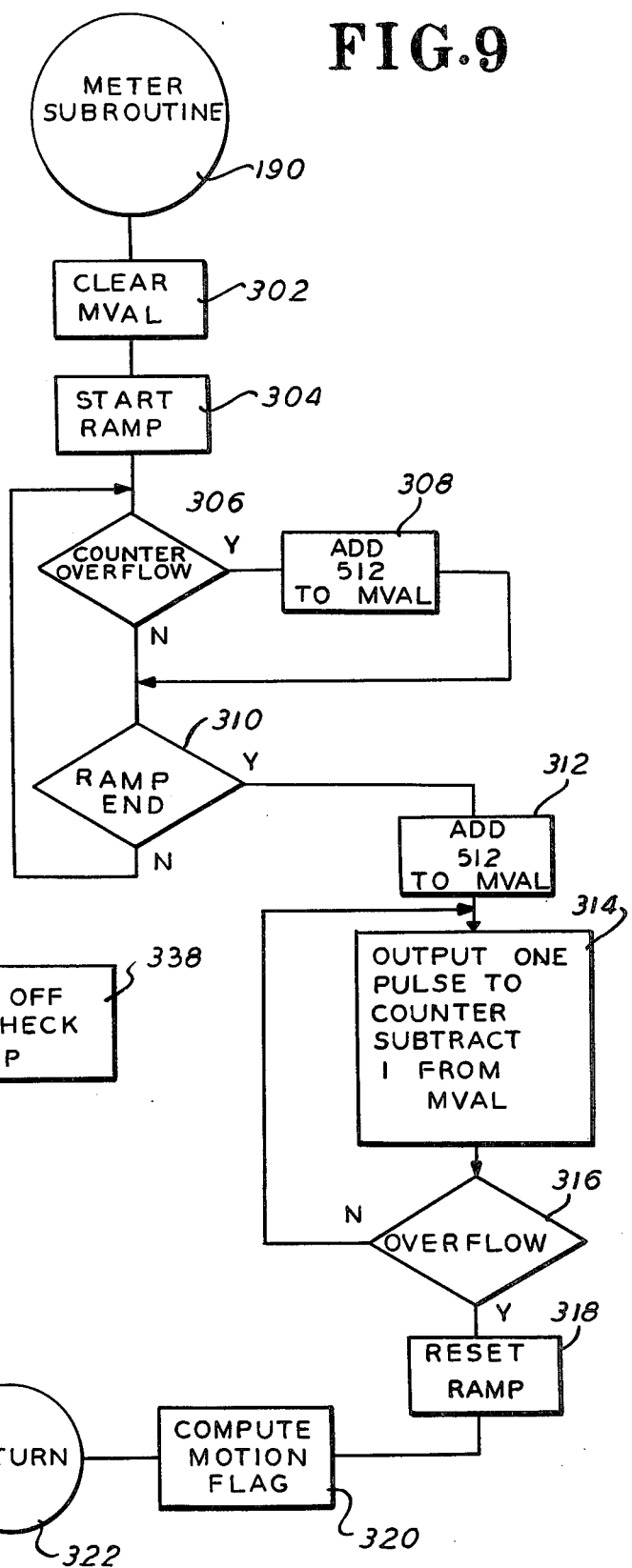

ELECTRONIC COUNTING SCALE

BACKGROUND OF INVENTION

This invention relates generally to electronic weighing scales, and more specifically relates to an electronic counting scale adapted to make an accurate determination of the number of individual units present in a sample provided to the said scale, which sample contains a group of such individual units.

In numerous industrial and commercial applications, a requirement exists for effecting a rapid and accurate determination of the number of unit pieces or articles present in a relatively large group of such individual units. Thus for example, a manufacturer or shipper of small electronic components, or of relatively small hardware pieces such as washers or the like, may in the course of operations, require an accurate count of the number of individual units present in a large group of such like pieces.

In the past, various mechanically-actuated counting balances have been known for application to the aforementioned purposes. Mechanical devices of this type commonly, for example, utilize a pair of weighing platforms or cradles. A single article may be emplaced on one of the said platforms, with the plurality of the identical articles being positioned on the alternate platform. By such an arrangement, it is possible (after calibration) to determine the number of articles on the alternate of the mentioned platforms—i.e. in that the balance point is a function of the number of grouped units.

In general, such mechanically-actuated devices as above described, have proved to be relatively undesirable in continuous operation. They are, among other things, complex in structure, tend to require a high degree of attention and maintenance; and are furthermore, difficult and relatively time-consuming to operate.

More recently, counting scales have been disclosed based upon modern electronic technology, with a load cell providing the desired inputs to the electronic circuitry. Thus, for example, in U.S. Pat. No. 4,043,412, a counting scale is disclosed which utilizes a single such load cell—which determines the weights of both a standardization sample and of the unknown quantity of articles in a group which is thereafter presented to the device.

While electronic counting scales, including devices such as disclosed in the aforementioned U.S. Pat. No. 4,043,412, have indeed been found effective in achieving their objectives, the versatility and dependability of such apparatus have been less than desired in a number of respects. In many such prior art devices for example, relatively conventional load cell structures are utilized, commonly based upon parallelogram flexure structures. Most of these prior art flexure structures include strain gauges at all flexing corners, thereby rendering it extremely difficult to compensate for gauge positioning errors; the said prior art structures are, further, subject to generation of second-order errors upon offset loading of the weight-receiving platform.

Further, the prior art electronic counting scales such as have been previously discussed, have been poorly adapted to use with a wide range of weight loads, i.e. generally, a given such device is adapted for use in counting groups of articles within a fairly narrowly-prescribed total weight range.

Furthermore, from a purely electronic viewpoint, numerous of these prior art electronic counting scales have been relatively lacking in long-term stability, and in features assuring accuracy and stability in count—as the number of objects successively added to the scale for counting is accumulated.

In accordance with the foregoing, it may be regarded as an object of the present invention, to provide an electronic counting scale possessing simplicity and dependability of operation, and including features enabling highly stable operation over an extended period, and dependable, accurate counts—even as the number of objects accumulated on the weight platform continues to increase.

It is a further object of the present invention, to provide an electronic counting scale of the aforementioned character, which can be based upon an electronic unit including substantially all of the electronic circuitry, displays, and actuating switches and the like, which unit is combined with a separable module including the load cell and associated sample-receiving platform and the like, whereby a plurality of differing capacity base modules may be utilized interchangeably with the said electronic unit—thereby increasing the versatility and utility of the said scale apparatus.

It is a further object of the present invention, to provide an electronic counting scale of the aforementioned character, which incorporates a load cell based upon a parallelogram flexure—which load cell design, however, is uniquely free of second-order errors generated from offset loading of the force-receiving platform; which load cell structure is further, adapted for trimming to compensate for small symmetry errors present in the load cell as originally fabricated and assembled.

It is a still further object of the present invention, to provide an electronic counting scale as above discussed, which includes highly effective auto-zero tracking means in the electronic circuitry—to thereby provide a valid zero for extended periods, independent of drift of the electronic components.

It is a yet further object of the invention, to provide an electronic counting scale as aforesaid, which includes operator-actuatable means for periodically updating the unit weight being maintained in memory as the standard for comparison with the unknown group, to reflect the larger standardization groups which become available during measuring runs, thereby enabling increased accuracy in count for unknown groups being measured by the scale.

SUMMARY OF INVENTION

Now in accordance with the present invention, the foregoing objects, and others as will become apparent in the course of the ensuing specification, are achieved in an electronic counting scale, which may from a mechanical viewpoint comprise a single relatively compact unit including all operable elements; or preferably which may be based upon a modular construction including, firstly, an electronics unit which includes all basic electronic circuitry necessary to operation of the apparatus, including display means, actuating switches and the like; and, secondly, a base unit adapted to form the rearward portion of the apparatus.

The said base unit in the said modular construction, includes the load cell, associated mechanical linkage, the weight-receiving platform, and the like. This base unit is adapted to directly receive the aforementioned electronics unit, and includes connector means for enabling electrical interconnection with the said electronics unit, and means for mechanically coupling the base unit to the electronics unit upon being joined therewith. By this modular arrangement, base units of differing weight capacities may be readily and quickly interchanged with a single electronics unit, whereby the operator—by having on hand a plurality of base units of different capacities—may be in a position to quickly and economically select among a plurality of such base units, that which is appropriate to enable use of the scale in the counting of specific types of objects. Since the present scale is further, purely a counting scale, and does not require or display any weight read-outs, the modular construction enables the aforementioned changes in bases without any necessity for span adjustments nor a requirement for program changes—which would otherwise be necessary to enable a weight read-out upon a change in scale capacity being effected.

The load cell utilized in the present apparatus is a parallelogram-type flexure frame, and is characterized by four strain gauges, with the said gauges being located at the upper and lower surfaces of two vertically overlying corner flexure regions of the parallelogram. The said gauges may thus be located at the corner flexure regions defined adjacent the supported side of the parallelogram frame, with a pair of such gauges thus being located at the upper and lower faces of each of the inside corner flexural regions of the said frame. This arrangement—because of symmetry considerations—is uniquely free of second-order errors generated by offset loading of the force-receiving platform; while at the same time, the said arrangement provides two corner regions completely free of strain gauges. These free corner regions provide sites which can be trimmed by filing or similar mechanical operations, to compensate for small symmetry errors present in the load cell as originally fabricated and assembled.

Pursuant to the invention, a platform for receiving the group of articles to be counted, is operatively associated with load cell means, which are thus actuated by the force applied to the platform, and which cell means generates an analog signal indicative of the force exerted on the platform by the group of articles.

Analog-to-digital (A-to-D) conversion means receive the said analog signal, and convert same to a digital signal indicative of the force acting at the platform, and thus of the size of the group of articles. Means are provided for subtracting the tare weight of the platform and other portions of the system acting on the load cell, from the said digital signal—to thereby provide a normalized digital signal, i.e. one indicative of the net weight of the group of articles. Means are further provided for generating a said normalized digital signal indicative of a pre-determined number of said articles, and for modifying that signal and storing a value indicative of the weight-per-unit for the articles of said group.

Means are included for dividing the normalized digital signal resulting from the presence of said unknown-sized group on said platform by the stored weight-per-unit value, to thereby determine the number of articles in said "unknown" group. Manually actuatable means, further, enable updating of the stored value of the weight-per-unit ratio—to reflect the number of articles on the platform at the time of updating.

Means are also provided for automatic-zero tracking, thereby enabling correction for drift in the electronic circuitry. In particular, if the net weight, i.e. the difference between internal meter-reading and the tare value, is less than a predetermined amount, the scale is assumed to be in a defined auto-zero tracking band; and means are provided for then introducing periodic corrections in accordance with a specific algorithm, to successively reduce the error.

BRIEF DESCRIPTION OF DRAWINGS

The invention is diagrammatically illustrated, by way of example, in the drawings appended hereto, in which:

FIG. 9 is a flow chart, illustrating operation of the microprocessor program in the course of A-to-D conversion; and FIG. 10 illustrates, via a schematic flow diagram, operation of the system of FIG. 7 during the auto-zero tracking operation.

DESCRIPTION OF PREFERRED EMBODIMENT

Figure 1:
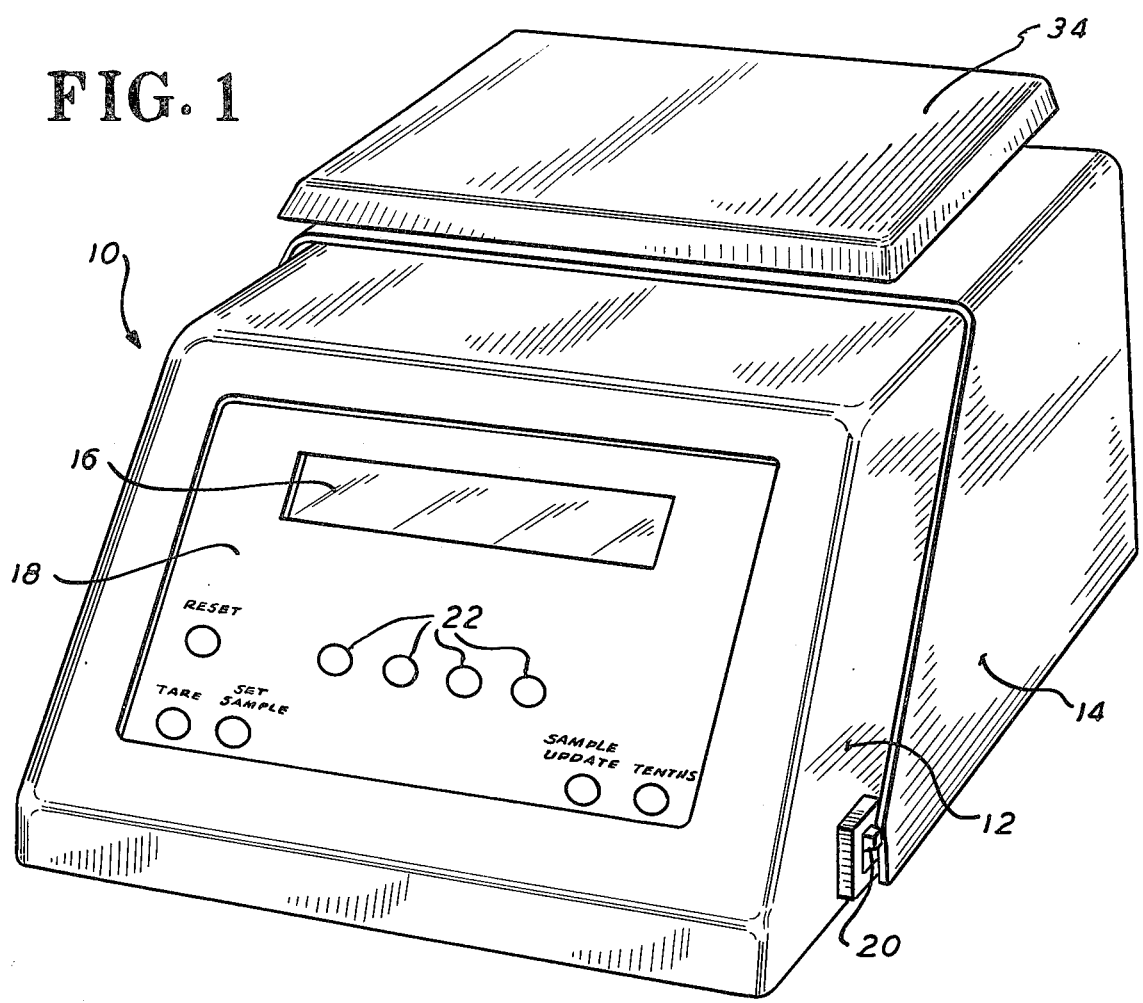
FIG. 1 is an external perspective view of a preferred embodiment of apparatus in accordance with the present invention.

In FIG. 1 herein, a perspective front view appears of a preferred form of apparatus 10 in accordance with the present invention. The view of FIG. 1 may be considered simultaneously with those of FIGS. 2 and 3, in order to better appreciate the relationship between the two modular components shown in their assembled relationship in FIG. 1. Thus it is seen that the apparatus 10 includes when assembled, a forward, electronics unit 12, which unit is telescopically received within a rearward, base module generally indicated at 14.

Figure 2:
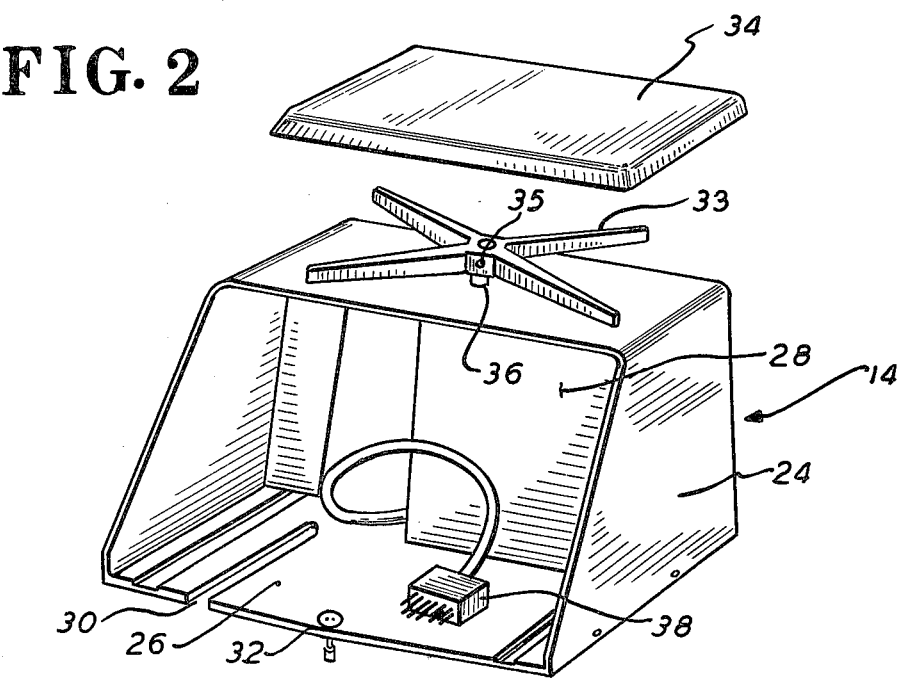
FIG. 2 is a perspective view of the base portion of the FIG. 1 apparatus, the view being taken from the open end thereof, in order to illustrate certain interior features of same, the weighing platform portion of the base being shown in exploded relationship to the remainder of the base, in order to illustrate additional structural features of the device.

As will be evident from FIGS. 1 and 2, as well as subsequent Figures herein, the electronics unit 12, carries virtually all of the electronic control and logic circuitry, as well as the various external controls and the display means for exhibiting and providing visual indications of the number of articles counted, as well as other information as may be required for operation of apparatus 10. Thus, from an external viewpoint, it is seen that a display panel 16 is provided on the front panel 18 of the electronics unit, which display is of a conventional type, i.e. including solid state or other indicators adapted to provide alpha-numeric displays. In addition, a series of manually actuated controls are provided. These include controls for RESET, TARE, SET SAMPLE, SAMPLE UPDATE, TENTHS; and a series of switches at 22, wherein the sample size may be set, such as "10"; "20"; "50" and "100", etc. Preferably, the actuating switches on panel 18 are of the pressure or capacitance change-actuated type, i.e. with no visible, moving external parts, as this both increases the efficiency and convenience of operating the present apparatus, and also improves the attractiveness of same. A power switch 20 is provided at the side of the electronics unit, with power being fed thereto by conventional connectors.

Figure 3:
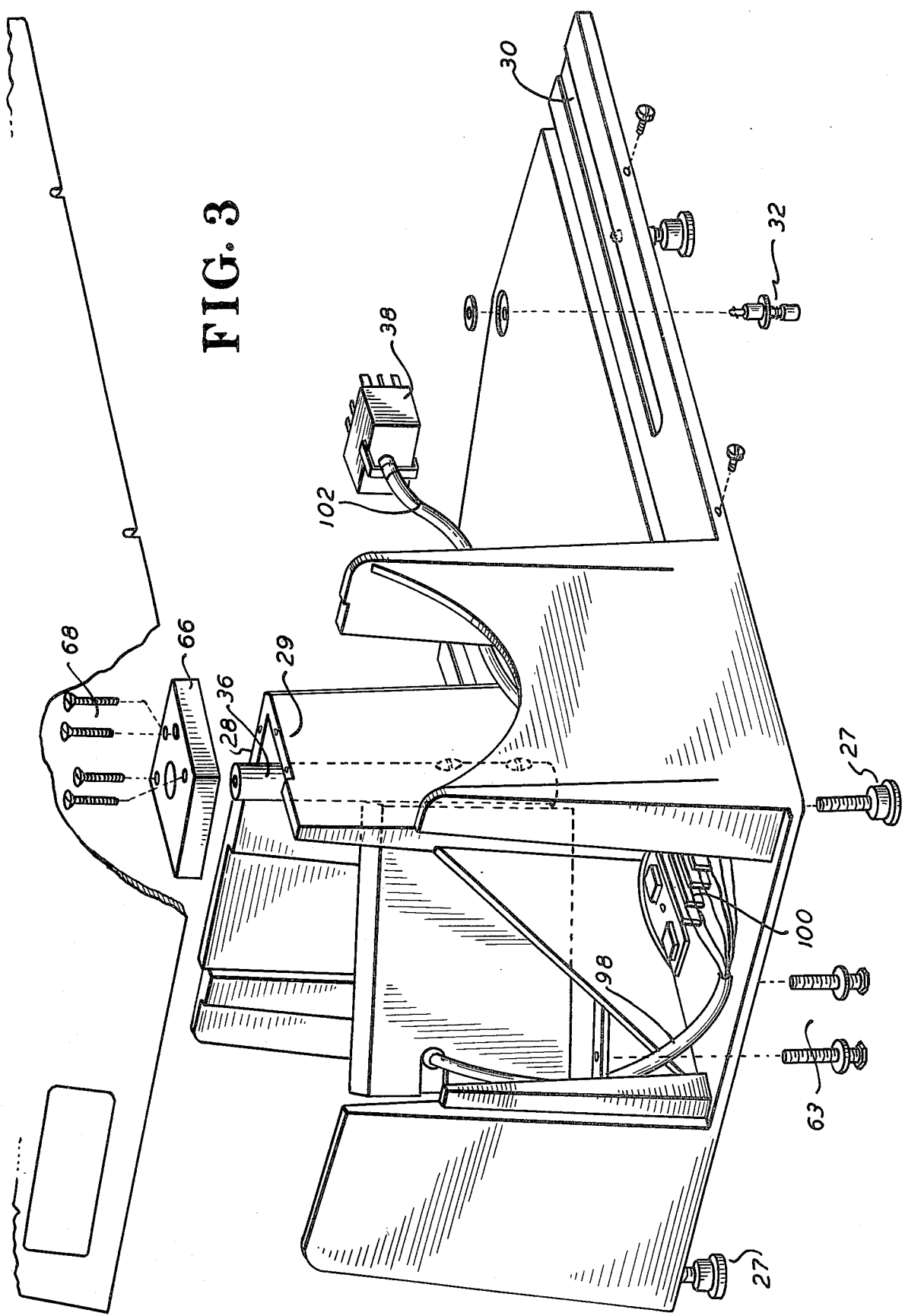
FIG. 3 is a partially exploded perspective view of the rear of the base depicted in FIG. 2, the view being useful in showing the position of the load cell within the remainder of the said structure.

Referring to the view of FIG. 2, (which is partly exploded and which may be usefully considered with FIG. 3) it is seen that base module 14 comprises generally, an external casing 24 which is secured to a base casting 26. The latter may be provided with a plurality of leveling feet, two of which are seen at 27. A vertical wall 28 protrudes upwardly from casting 26 and extends across part of casing 26. Wall 28 acts as a stop, upon electronics unit 12 being received within casing 24. It will further be noted, that a slot 30 extends from the open front of the casing in a rearward direction. This slot allows the power connector cord for the electronics unit 12 to pass outside the apparatus 10. Once the electronics unit 12 is received within casing 24, it is maintained in place by means of a locking stud 32, which is receivable and lockable at an opening (not shown) at the bottom of unit 12.

The weighing platform 34 is seen from the exploded view of FIG. 2 to be supported by a spider 33, which is in turn, secured to post 36 by a set screw 35.

It will be apparent from the discussion thus far had, that electronics unit 12, and base module 14 may be readily assembled and disassembled. Indeed aside from the mechanical sliding-interfit previously discussed, the only operations that need be effected is attachment of the electrical power connector to the electronics unit (e.g. via a conventional bayonet or similar connection), and connection of the load cell input connector 38 to an input connection point on electronics unit 12. The particular advantage of the present modular arrangement, is that a single electronics unit 12 may be utilized with a variety of base modules, such as module 14. Thus, the user may have on hand a plurality of base modules 14 of different capacities, which units may be readily interchanged and immediately interfitted with a single electronics module, to thus enable complete versatility in operation of the present apparatus.

Since the present scale is further, purely a counting scale, and does not require or display any weight readouts, the modular construction enables the aforementioned changes in bases without any necessity for span adjustments nor a requirement for program changes— which would otherwise be necessary to enable a weight read-out upon a change in scale capacity being effected.

Figure 4:
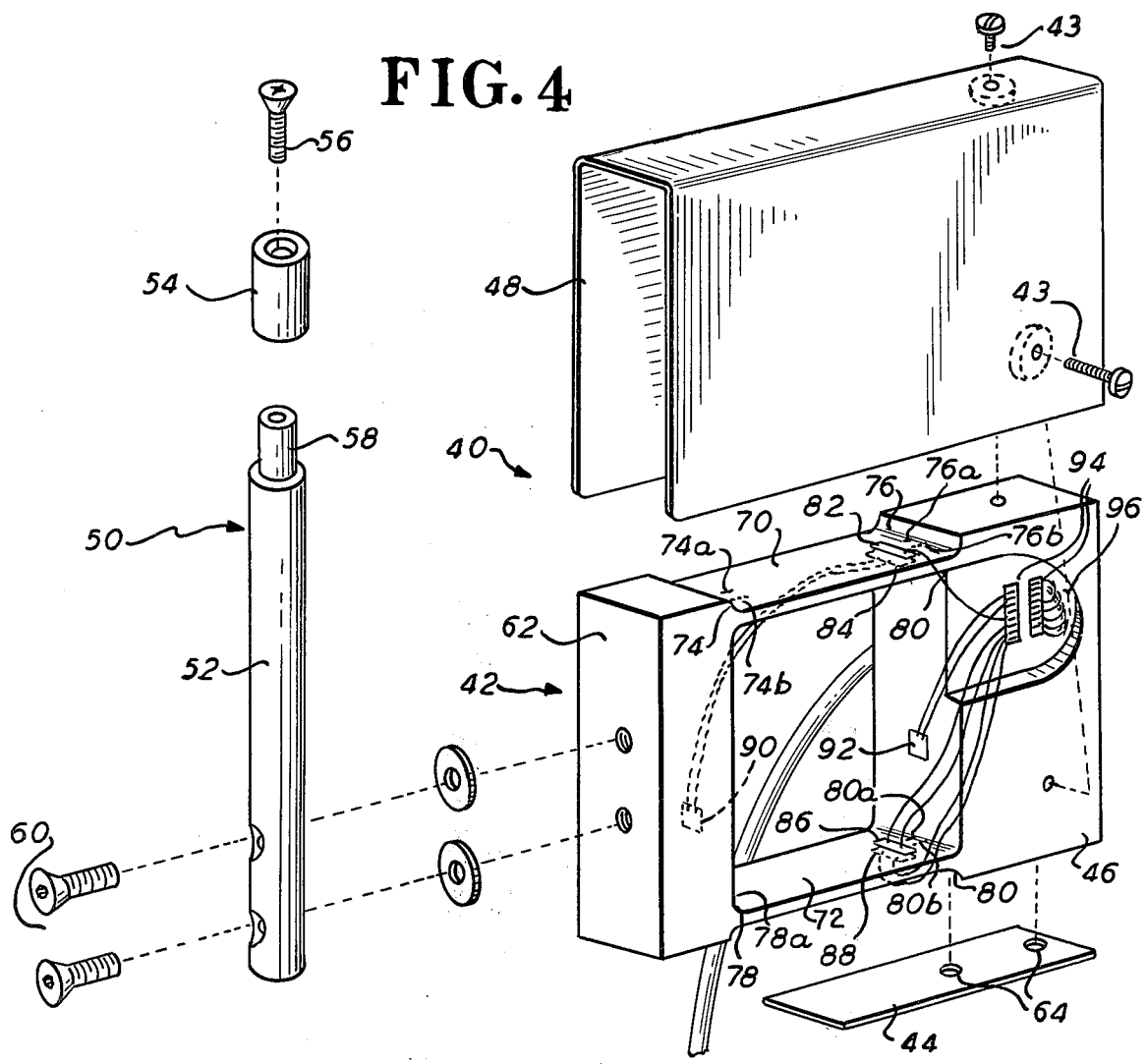
FIG. 4 is a perspective exploded view of the load cell and post assembly portions of the present apparatus.

Reference may be usefully had in connection with the details of the construction of the load cell and post assembly, to both the exploded perspective view of FIG. 3, and to the more detailed, exploded view of FIG. 4.

Referring especially to FIG. 4, it is seen that the load cell assembly 40 comprises a load cell frame 42 of one-piece construction, formed for example of aluminum, of stainless steel or the like; a spacer plate 44, which is secured by cementing to the bottom of the base leg 46 side of frame 42; a cover element 48, which is receivable about the top and lateral sides of load cell frame 42 and secured by fasteners 43, to cover and protect same; and a post assembly 50, including a main portion 52, and an upper cap 54 secured by a screw 56 to the reduced upper end 58 of portion 52. The cap 54 may be removed to modify assembly 50 to accomodate different weight-receiving platforms. Assembly 50 is secured by fasteners 60 to the load-receiving leg 62 of frame 42.

As seen from FIG. 3, the load cell and post assemblies are received at the base 26 of base module 14, where they are maintained by the pair of threaded fasteners 63, which are received (as seen in FIG. 3), through openings 64 and into the bottom of base leg 46 of load cell frame 42.

It is seen further, that the upper end of post assembly 50 projects upwardly, with the said upper ends passing through side load block 66. The latter is secured to the top edge of wall 28 (including to the perpendicularly extending wing 29 thereof, by fasteners 68). The said side load block 66 acts to prevent undue sidewise loading of the post assembly—which is secured to the weighing platform 34—in the event of severe accidental side thrust.

By referring especially to FIG. 4, it will be seen that the load cell frame 42 is in the form of a parallelogram—such parallelogram being defined by the vertical base leg 46; the opposed vertically-oriented load-receiving leg 62; an upper horizontal member 70 which can be a relatively thin and flexible leaf spring; and an opposed, lower horizontal member 72, which again can be a relatively thin and flexible leaf spring.

As is generally known to those familiar with the present art, the horizontal members 70 and 72, respectively join the vertical legs 46 and 62 to define four corner flexure regions 74, 76, 78 and 80. These corner regions each include upper and lower surfaces 74a, 74b, etc, which curve smoothly into legs 46 and 62. The corner flexure regions can undergo flexure upon a substantially vertical load being impressed at leg 62.

In accordance with an important aspect of the present invention, the four strain gauges 82, 84, 86 and 88—of the usual type which exhibit a change in electrical resistance proportional to the elongation or compression thereof—are all arranged in vertically overlying relationship with respect to one another. It is thus seen that in the present arrangement of the strain gauges, each of the horizontal members 70 and 72, carries a pair of such gauges, which are thus mounted toward vertically overlying corner flexure regions of each horizontal member 70 and 72. Thus, as in FIG. 4, gauges 82 and 84 are mounted in overlying relation at corner region 76 of member 70, i.e. gauge 82 is at upper surface 76a, and gauge 84 at lower surface 76b; and gauges 86 and 88 are mounted in overlying relation at corner region 80 of horizontal member 72, i.e. gauge 86 is at upper surface 80a, and gauge 88 at lower surface 80b; with all gauges 82, 84, 86 and 88 being vertically overlying—i.e. disposed transverse to a single vertical line.

One direct consequence of this arrangement is that the corner regions 74 and 78 are completely free from gauges, rendering these gauge-free regions available for minor machining operations, such as filing or grinding, to enable compensation for gauge positioning errors; and to enable adjustment to assure virtually zero error from offset loading.

The arrangement of FIG. 4, i.e. wherein the said gauges are all positioned in vertically overlying relationship with respect to one another, is further significant in respect of the presence on horizontal members 70 and 72 of gauges at both the upper and lower surfaces of each member. Thus for example, the gauges 82 and 84 (as already mentioned) are respectively at the upper and lower surfaces of corner flexure region 80. In particular, it has been found that "longitudinal offset loading" upon post assembly 50—by which quoted term is meant that the force applied to the overlying weighing platform 34 is offset from the axis of post 52, but in line with the median plane of the parallelogram defined by frame 42—produces a second-order bending moment at the four corner flexure regions 74, 76, 78 and 80, which varies as the square of the applied load. This error will cancel in the bridge circuit which is conventionally used with the electrical strain gauges, only if the said gauges are indeed placed on two overlying corner flexure regions. Further, the second-order bending torque varies so rapidly over the thickness of the horizontal members 70 and 72, that cancellation will be obtained only if gauges are placed on both the upper and lower surfaces of each of these two corner flexure regions.

It will be appreciated in this connection, that it is thus possible in accordance with the invention, to also mount the four strain gauges 82-88 at the corner flexure regions of frame 42 toward the load-receiving leg 62, i.e., at the corner regions 78 and 80—although this is not as preferable as the construction shown.

The present arrangement, as also mentioned, is well-adapted for compensating for "transverse offset loading"—by which is meant the circumstance wherein the load applied to weighing platform 34 produces its equivalent force acting at a point displaced from the median plane of the parallelogram defined by frame 42. Compensation for this type of error can (as mentioned) be effected by simply filing or grinding the strain gauge-free corner flexure region which it is determined is in tension for this type of condition, such machining being effected at the lower surface of such region; and by lowering the corner region which is in compression, by filing at its upper surface.

Similarly, in the instance of longitudinal offset loading, one determines which horizontal member 70 or 72 is in tension, and effectively moves that member upward, by filing or grinding its lower surface at the end thereof which is free of strain gauges. This will cause the member in tension to pull downward, thus increasing the apparent pull of the weight. In like fashion, the member in compression is lowered, by grinding its upper surface at the end of the member which is free of strain gauges. Using these procedures, an experienced operator can, in very short order, trim a load cell of the present design to a one-part-in-five-thousand error for offset loading of 2L, where L is the horizontal dimension of the horizontal member.

In addition to the mentioned strain gauges 82-88, it is seen that sets of temperature compensation resistors 90 and 92 are mounted at the inwardly facing walls of legs 46 and 62. Various interconnections for the conventional bridge measuring circuit used in the apparatus are effected at interconnection boards 94, which are mounted within the recess 96 of leg 46. Connections from the board 94 are made via cable 98 to a fixed connection board 100 at base 26; and as seen in FIG. 3, a cable 102 leads (from board 100) to connector 38, which as previously mentioned, is receivable within the separable electronics unit 12.

Figure 5:
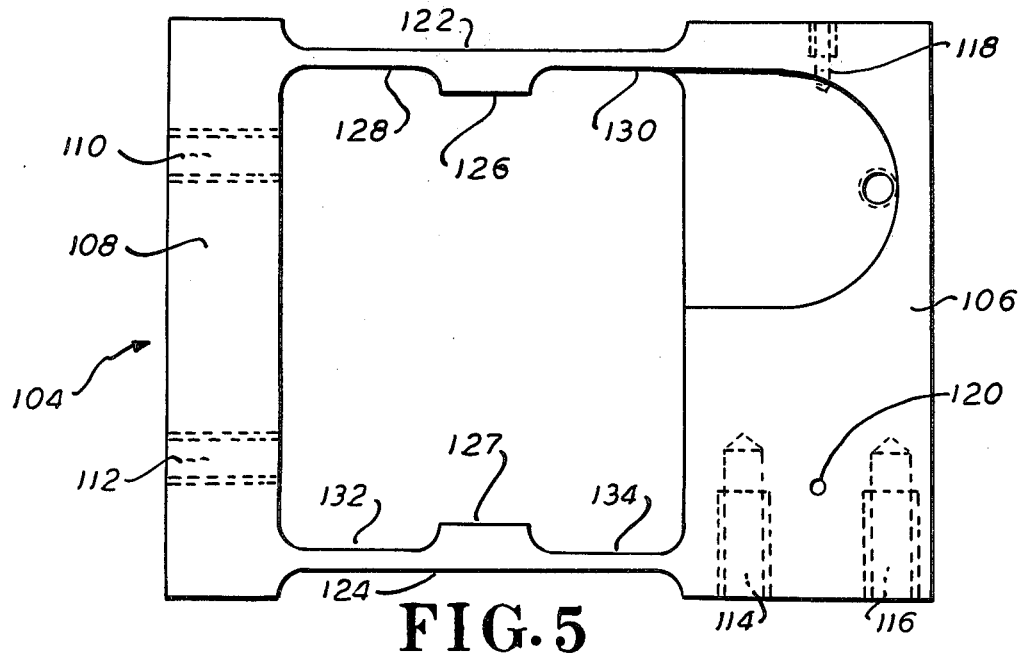
FIG. 5 is a side view of a further embodiment of a load cell utilizable in accordance with the invention.
Figures 6, 7:
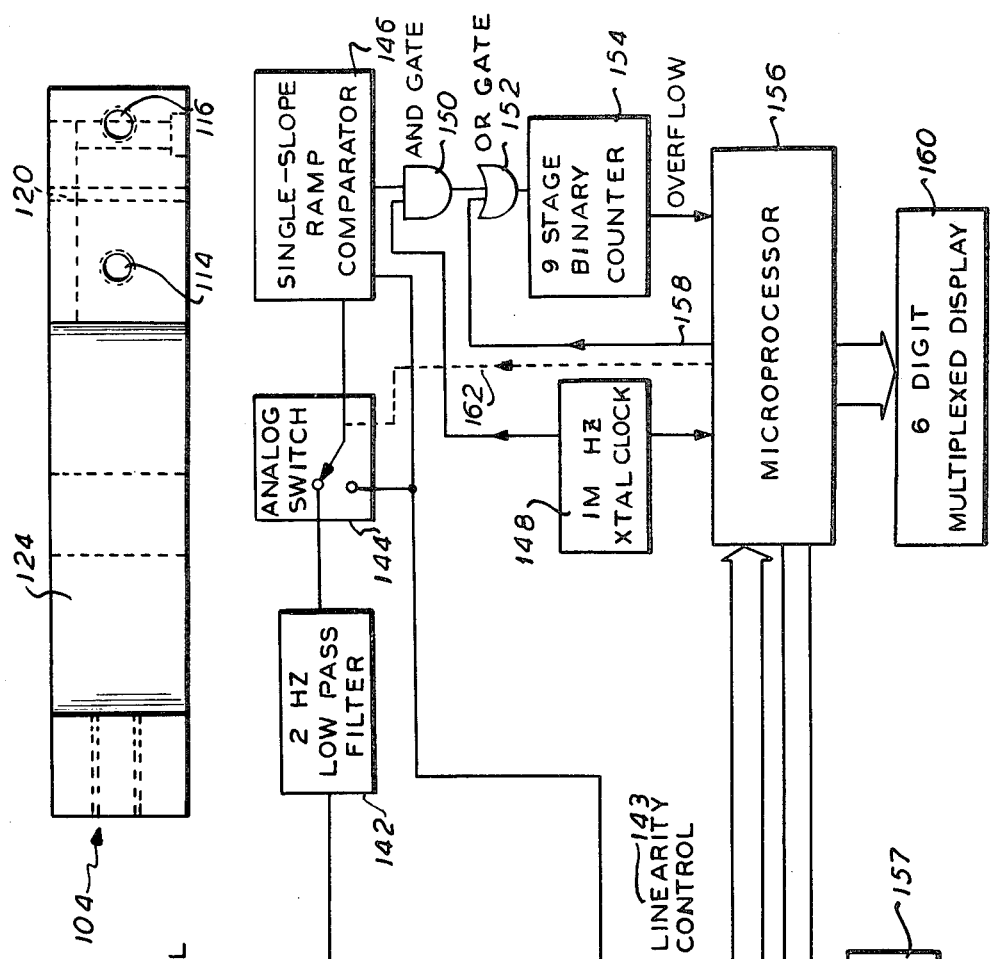
FIG. 6 is a bottom view of the cell of FIG. 5.
FIG. 7 is a simplified block diagram of the electronics system utilized in the present apparatus.

In FIGS. 5 and 6 herein, side plan and bottom views appear of an alternate embodiment of a load cell frame utilizable with the present invention. The load cell frame 104 of these Figures is, in general, structured to function in a manner similar to the load cell frame 42 heretofore discussed. Such frame 104 thus includes a base leg 106, and an opposed load receiving leg 108—the latter being securable to a post assembly similar to post assembly 50 of FIG. 4, by means of openings 110 and 112 provided in same. Similarly, the leg 106 includes openings 114 and 116 at the bottom of same, which may receive fasteners after a spacing plate such as plate 44 in FIG. 4 is first affixed to the bottom of the leg 106 in the manner previously discussed. Such fasteners serve to secure frame 104 to the base casting 26. Further, openings are provided at 118 and at 120 to enable a cover 48 (as in FIG. 4) to be provided about the said frame 104. The frame 104 differs from frame 42 primarily in respect of its upper and lower horizontal members 122 and 124. Whereas in the instance of frame 42, such members comprise a generally uniformly thin leaf spring, in the instance of frame 104 such members are not uniformly thin; but rather include central, relatively thick portions 126 and 127, to the sides of which are defined thin flexure webs 128, 130, 132 and 134. In the type of design illustrated in FIGS. 5 and 6, most of the bending occurs at the flexure webs 128, 130, 132 and 134; although in both frame 42 and frame 104, the majority of the bending (in any event) will occur toward the ends of the horizontal members.

In comparing the frames 42 and 104, it is generally considered, that frame 42 is preferred for use in the present invention. The leaf spring design is thus more compliant than the web design of the same sensitivity, which results in a lower resonant frequency (deemed disadvantageous), and a somewhat less critical overload stop—which is deemed an advantage. Strain gauge placement in general, is less critical in the leaf spring design; further, the flat surfaces of the leaf spring design permit easier application of strain gauges, and provide a larger surface for filing or grinding to trim the member. On the other hand, for very low capacity cells, where the webs become quite thin, the design of FIGS. 5 and 6 is somewhat easier to machine, since the leaf spring structure tends to deflect excessively during machining.

In FIG. 7 herein, a simplified block diagram appears of the electronics system utilized in the present invention. The block diagram of FIG. 7 may best be considered simultaneously with the flow chart of FIGS. 8A and 8B, which sets forth the main program utilized in the present device; and with FIGS. 9 and 10, which respectively relate to the meter subroutine involved in the A-to-D conversion method utilized, and to the auto-zero subroutine utilized in operation of the invention.

Thus in FIG. 7, it is seen that a balanced ±7.5 v supply 136 provides excitation for the load cell forming part of a load-cell-bridge generally depicted at 138. The said bridge and operation thereof, is in accordance with principles well understood in the present art.

The output signal from bridge 138 is amplified by the low-drift amplifier 140, and then passed through a low-pass filter 142, typically a 2 Hz filter, which acts to eliminate vibration. The signal from filter 142 (which can occasionally be fine-adjusted by creep control 141 and linearity control 143) is passed through analog switch 144, and then provided to a A-to-D converter, which includes single-slope voltage ramp comparator 146, a 1 MHz crystal clock 148, AND gate 150, OR gate 152, and a 9-stage binary counter 154, which elements operate to convert the input signal from analog switch 144 to a 0–200,000 BCD number.

The conversion process is controlled by microprocessor 156. The microprocessor 156 which is in communication with control panel 157 of unit 12, is too slow to count the individual 1MHz clock pulses directly. Instead, the pulses—upon passing through AND gate 150 and OR gate 152, are accumulated in the 9-stage binary counter 154 until an overflow occurs. The microprocessor counts these overflows and after the ramp is complete, generates sufficient additional pulses via line 158 to OR gate 152 to advance the counter 154 to one more overflow. This final step provides all the information necessary to assemble a six-digit BCD number over the range of 0–200,000, which is provided to multiplexed display 160 and is representative of weight.

After each TARE command, and at regular one-minute intervals, microprocessor 156 switches to the ramp comparator's input voltage, i.e. by switching analog switch 144 through control path 162, to measure the load-cell-bridge excitation voltage. This reference measurement calibrates the ramp comparator so that all measurements are ratiometric to the bridge excitation voltage.

The six-digit time-multiplexed display 160 is generated by microprocessor 156 on an interrupt basis. For each digit, the microprocessor generates a 4-bit BCD number, and a 4-bit command code which selects the appropriate digit. Seven-segment drive signals are generated, which in turn feed the seven-segment drivers. The six-digit display is driven in a seven beat period which repeats itself periodically. The component subperiods are timed out by the microprocessor's interval timer, which interrupts the program to service the display at the conclusion of each period. Six of the subperiods are used to display the six digits; and the seventh subperiod is used to generate other command codes which interrogate the keyboard, control lamps, and control analog comparator status. Both lamp and comparator states are held in latches set by the microprocessor whenever changes are required.

Figure 8A:
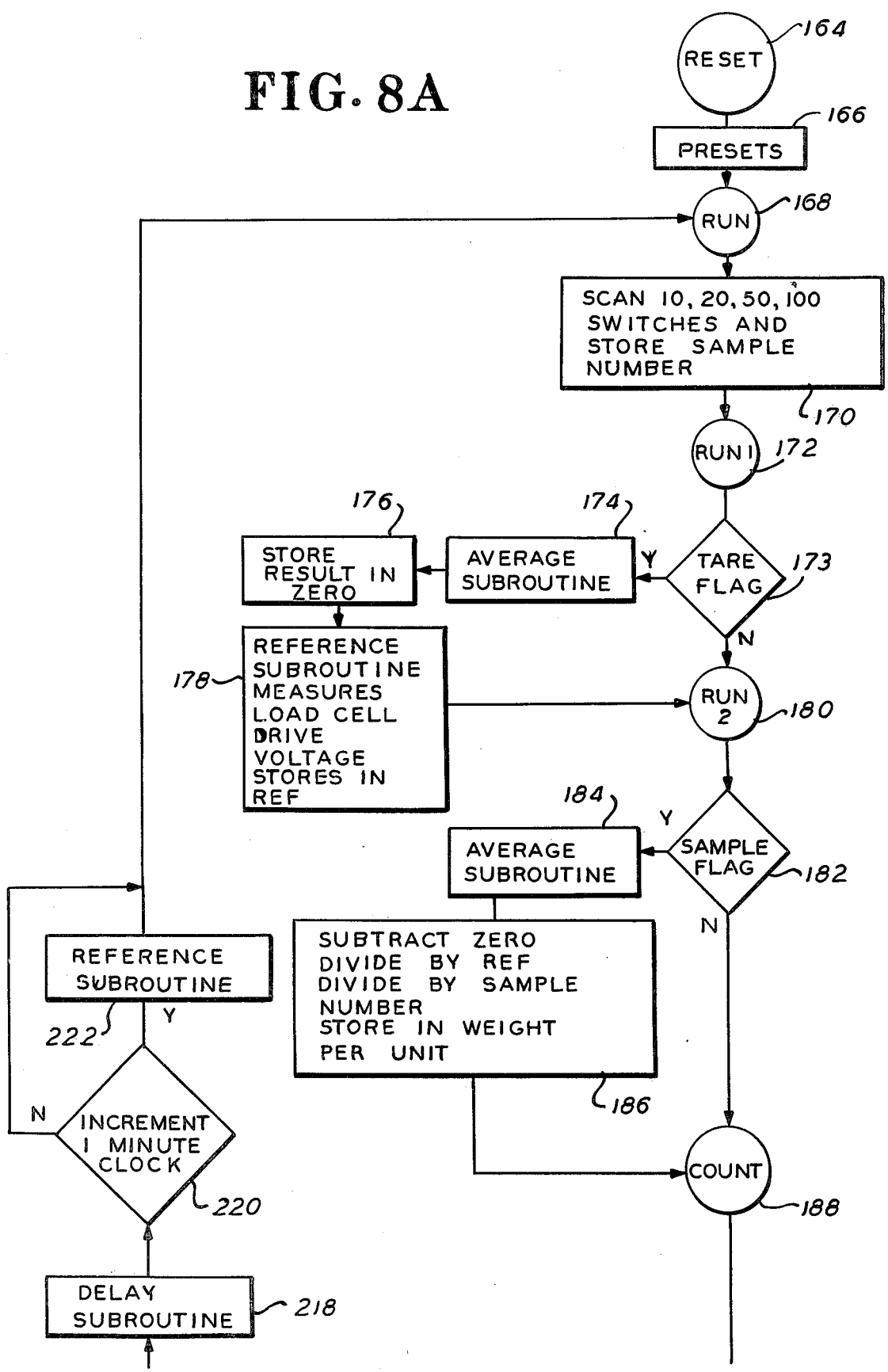
FIGS. 8A and 8B taken together, constitute a flow chart, schematically illustrating the main program implemented by the system depicted in FIG. 7.
Figure 8B:
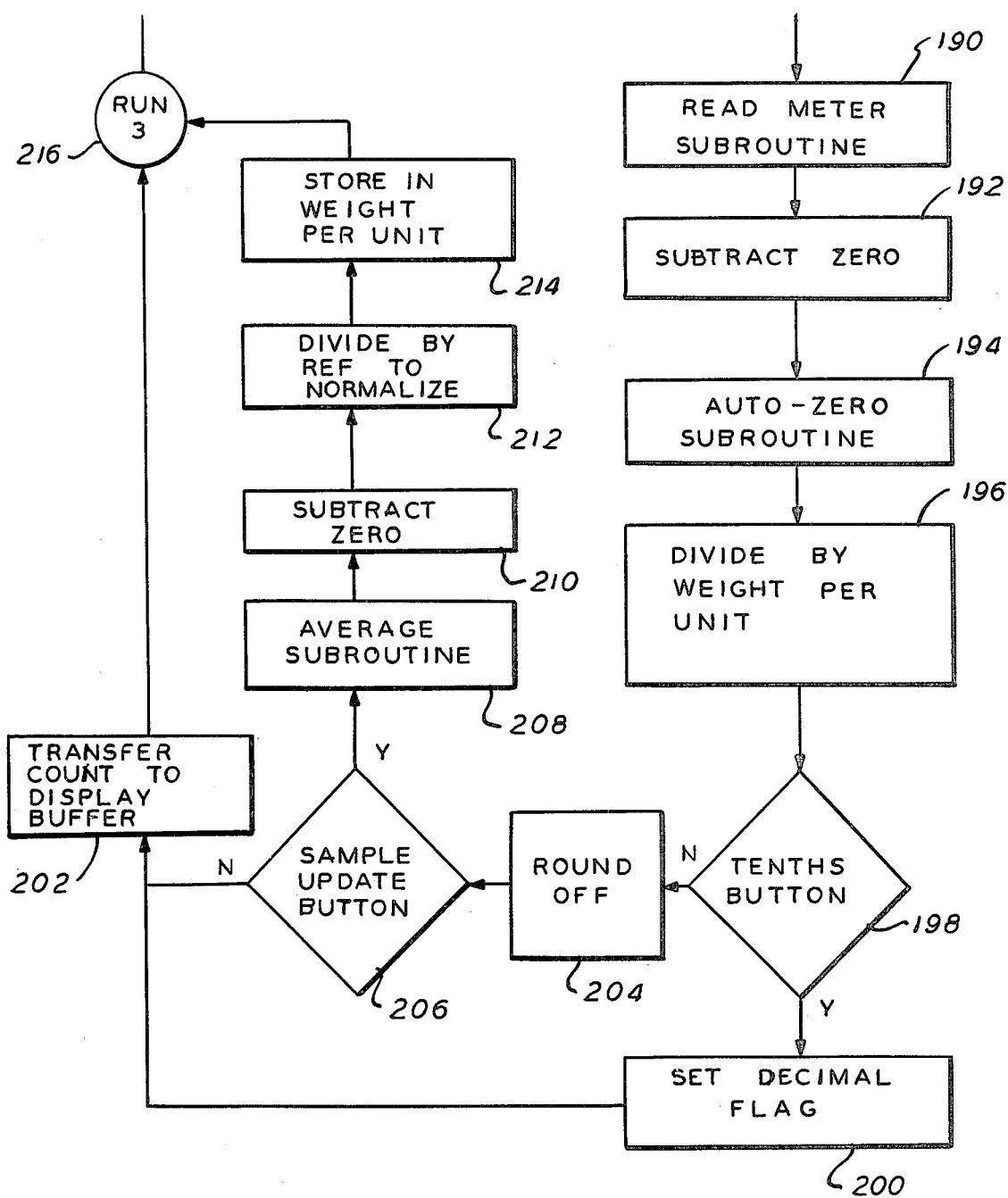

As thus seen in the overall flow chart program of FIGS. 8A and 8B (8B underlies 8A), upon a run being initiated at 168 (the various controls at face 18 having been reset at 164 and the system reset at 166) the sample size switches 22 are scanned (at 170) and the sample number thus selected is stored. Thereafter, in the initial run 1 (at 172), and if a TARE operation (at 173) is underway, i.e. as as result of the TARE switch at face 18 being activated, the current digital value for the analog signal is stored as the current zero (at 176). During this operation the average subroutine (at 174) is such as to average four successive meter-readings, with restarting being effected if signal motion occurs. During all other operations (sample and count), the zero value is subtracted from the current analog value to yield a signed, normalized number that represents weight in arbitrary units. A reference subroutine (at 178) also measures the load cell drive voltage and stores this in reference.

Thereafter, at run 2 (at 180) and assuming that a sample is now set (as suggested in FIG. 8A by SAMPLE FLAG at 182) the average subroutine (at 184) is again carried out, and as seen, the stored zero value is subtracted, a division by the reference value is effected; and then a division by the sample weight to result in a figure which is stored, representing the weight/unit for the articles forming the sample (all at 186).

Continuing to refer to FIG. 8A, it is seen that if an unknown sample—i.e. including an unknown number of objects—is now to be determined, i.e. a "COUNT" (at 188), the read meter subroutine (at 190 in FIG. 8B) is now initiated. This is basically the A-to-D conversion scheme previously discussed. Reference may be had in this connection to the flow chart of FIG. 9, wherein it is seen that the memory is first cleared (at 302) and the ramp started (at 304). Thereafter, assuming the mentioned 9 stage counter 154 is utilized, it is seen that 512 is added to the memory value (at 308) upon each ensuing overflow of the said counter (at 306). Upon the ramp ending (at 310), 512 is again added to the counter. Thereupon sufficient additional pulses are generated, as already mentioned, to advance the ramp to one further overflow, at which time, it is reset.

More specifically, it is seen that upon the ramp ending 512 counts are added to the memory (at 312). Thereupon microprocessor 156 outputs pulses to the counter while subtracting the same number from memory (at 314), until an overflow occurs (at 316), at which time the ramp is reset (at 318). A motion flag is checked (at 320), and if no signal motion is present the subroutine is returned (at 322).

Continuing to refer to FIG. 8B, it is seen that the zero is subtracted at 192, after which the auto-zero subroutine (at 194 and 330 in FIG. 10) is initiated.

The algorithm used in the scheme set forth in FIG. 10, is designed to be conservative for large noise distribution, but rapid near zero. Further no dead-band or uncertainty of equilibrium point exists. More specifically, and bearing in mind that the internal meter-reading varies in the range of 0–200,000, it is seen in FIG. 10 that if the net weight, i.e. the meter-reading minus the tare value, is greater than 5, i.e. is more than 0.0025% of full scale, the correction value to be applied is deemed to be zero. If on the other hand, the net weight is five or less, i.e. less than 0.0025% of full scale, the scale is assumed to be in the auto-zero tracking band; and the correction value is computed by the expression: $C = \pm[(M-T) = 1]/2$, when M is the meter reading and T the tare value, with the + or − sign chosen to bring the net weight (M−T) closer to zero. (These operations are seen at 332 and 335 of FIG. 10) The result of this computation can be summarized by the following table:

| M-T: | −7 | −6 | −5 | −4 | −3 | −2 | −1 | 0 | +1 | +2 | +3 | +4 | +5 | +6 | +7 |
|---|---|---|---|---|---|---|---|---|---|---|---|---|---|---|---|
| Correction: | 0 | 0 | −3 | −2 | −2 | −1 | −1 | 0 | +1 | +1 | +2 | +2 | +3 | 0 | 0 |

It is thus seen from this table, that as specified, the algorithm is such as to produce rapid corrections near zero, but little correction for large, rapid noise fluctuations—where the electronic pre-filtering via filter 142, eliminates such variations sufficiently without requiring further digital filtering.

It will also be noted from FIG. 10 that when the auto-zero operation is instituted, a zero check-lamp is actuated (at 336). This, however, will be extinguished as indicated at 338, upon the net weight being displaced outside the auto-zero tracking band. In either event the subroutine is returned (at 340).

It will, of course, be appreciated that the overall purpose of the auto-zero tracking feature is to provide a valid zero for extended periods, independent of drift in the electronic components. Without such feature, the operator would in essence, need to depress the TARE button before every sample and count operation, to achieve maximum accuracy.

Referring again to FIG. 8B, it is seen that on completion of the auto-zero subroutine 194, the adjusted meter-reading is divided by the weight/unit (at 196) as previously stored in memory. If the TENTHS button (at 198) has been actuated (FIG. 1), a decimal flag (at 200) is set, and the TENTHS digit is displayed without rounding, i.e. this value is transferred to a display buffer (at 202) forming part of multiplexed display at 160, for ultimate display. If the TENTHS button has not been pressed, the reading is rounded off (at 204) to the nearest digit; and assuming that the SAMPLE UPDATE actuating switch (FIG. 1 and at 206 FIG. 8B) has not been depressed, the rounded-off figure is provided to the display buffer (at 202) for ultimate display.

The SAMPLE UPDATE button in the flow diagram of FIG. 8B, (and FIG. 1) is actuated by the operator as desired, in order to update the stored sample value to reflect an increased number in the sample known to be present, thereby assuring greater accuracy in the stored value of weight/unit. As is thus seen, when the sample update button is depressed, four successive meter-readings are averaged (at 208)—as has been described during the SET SAMPLE procedure. However, the zero-adjusted reading (at 210) is now divided (at 212) by the last count rounded off to the nearest integer value, and this new value is stored as weight/unit in memory (at 214).

A delay subroutine is used to separate each A-to-D conversion by the same time interval (approximately 300 milliseconds) to provide a subjectively pleasing displaying update rate, and to allow sufficient time between successive conversions to permit complete discharge of the ramp storage capacitor. This same delay subroutine is used during the average subroutine as well. After each TARE command and at regular one-minute intervals, as suggested at block 220, the microprocessor 156 switches to the ramp comparator's input voltage—as also discussed in connection with FIG. 7—to measure the load-cell-bridge excitation voltage. At this time, the reference subroutine 222 is carried out, the purpose of which as discussed, is to calibrate the ramp comparator so that all measurements are ratiometric to the bridge-excitation voltage.

It will be understood that all operations of the programs and subroutines described are carried out under control of the logic of microprocessor 156, which is in communication with control panel 157 and with the six-digit multiplexed display 160 as seen in FIG. 6.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A counting scale for determining and indicating the number of articles in a collection of substantially identical said articles; comprising in combination:
   a weighing platform for receiving said collection of articles;
   load cell means actuated by said platform for generating an analog signal indicative of the force exerted on said platform by said collection of articles;
   A-to-D conversion means for receiving said analog signal, and converting same to a digital signal indicative of said force, and thereby of the number of articles in said collection;
   means for generating and storing a digital signal indicative of the tare weight acting at said load cell;
   means for subtracting said signal indicative of the said tare weight from said signal indicative of the number of articles in said collection, to thereby normalize said latter digital signal;
   means for generating and storing a digital signal indicative of the weight per unit article of a predetermined size group of said articles;
   means for dividing said normalized digital signal by said stored weight per unit value to determine the said number of articles;
   means for displaying the thereby determined number of said articles; and
   manually actuatable means for periodically updating said stored value for said weight per unit article to reflect the number of articles on said platform at the time of effecting said updating, said means being operable to effect said updating for any accumulated number of said articles.

2. Apparatus in accordance with claim 1, wherein said scale is devoid of weight read-outs, and said weighing platform and said load cell are contained within a base unit including mechanical and electrical interconnection means to a separable electronics unit receivable within said base unit; said electronics unit including the remainder of said means for receiving said analog signal and processing same to provide said digital signal indicative of the number of said articles; whereby said electronics unit may be interchangeably received within a plurality of said base units having differing weight-receiving capacities and without any necessity for span adjustments.

3. Apparatus in accordance with claim 1, wherein said load cell means comprises:
   a parallelogram-shaped frame defined by a first vertical leg adapted for supporting said frame, a second opposed vertical leg for receiving generally vertically-directed forces to be measured by said cell, and first and second generally horizontal flexure members respectively extending between said first and second vertical legs at the upper and lower ends thereof, to define said parallelogram; said members including corner flexure regions defined toward the joinings thereof with said vertical legs; and
   a pair of electrical strain gauges being mounted to each of said horizontal flexure members at the upper and lower surfaces of the corner flexure regions of each member residing toward the same one of said vertical members whereby said strain gauges on said horizontal members vertically overlie one another; the corner flexure regions of each of said horizontal members opposed to the ends carrying said mounted gauges being free from strain gauges, whereby said strain gauge-free ends of said members may be adjusted by machining or the like to compensate for symmetry errors caused during fabrication and assembly of said cell means.

4. Apparatus in accordance with claim 3, wherein said strain gauges are four in number, a pair of said gauges being located at each said member at the upper and lower surfaces of the said corner flexure region thereof.

5. Apparatus in accordance with claim 4, wherein said strain gauges are mounted at said corner flexure regions adjacent said leg adapted for supporting said frame.

6. Apparatus in accordance with claim 1, including means for periodically determining the net weight of any said articles on said platform, and for adjusting the reading of said scale in the direction of zero, if said net weight is less than a predetermined percentage of full scale.

7. Apparatus in accordance with claim 6, wherein the signal from said load cell means is amplified and passed through a low-pass filter, prior to said A-to-D conversion, in order to filter signal components generated by mechanical vibration.

8. Apparatus in accordance with claim 7, wherein said A-to-D conversion means comprises:
 a ramp comparator means for generating a ramp signal and comparing said analog signal from said load cell means with said ramp signal;
 clock means for generating time-ordered pulses;
 gating means connected to said ramp comparator means and said clock means, for outputing said clock pulses while the level of said analog signal exceeds said ramp signal;
 binary counter means for receiving said outputed pulses from said gating means; and
 means for counting the overflows from said counter means to provide indication of the total number of pulses gated to said counter, and thereby indication of the digital value of said analog signal.

9. Apparatus in accordance with claim 8, including means connected to said gating means for generating a further overflow from said counter means upon said ramp signal level equaling the level of said analog signal, and for generating a further sequence of pulses corresponding to the difference between the overflow capacity of said counter and the counter reading at said signal equalization, for enabling subtraction of said further sequence of pulses from the digital number of said clock pulses corresponding to the total said overflows, to thereby adjust said digital number corresponding to said total overflows to reflect the reading of said counter at said signal equalization point for said ramp and analog signals.

10. In an electronic scale of the type adapted for counting articles and devoid of weight-read out capabilities, and including a weight-receiving platform; a load cell actuated by force applied to said platform in consequence of the presence of a group of articles, the number of which are to be determined by said scale; and an electronic system connected to receive and process the output analog signal from said load cell, and indicate the number of articles in said group after an initial standardization run on said scale utilizing a group of a predetermined number of said articles; the improvement wherein:
 said weight-receiving platform and said load cell are contained within a base unit including mechanical and electrical interconnection means to a separable electronics unit receivable with said base unit, said electronics unit including said electronic system; whereby said electronics unit may be interchangeably received within a pluralitity of said base units having differing weight-receiving capacities, and without any necessity for span adjustments.

11. A counting scale for determining and indicating the number of articles in a collection of substantially identical said articles; comprising in combination:
 a weighing platform for receiving said collection of articles;
 load cell means actuated by said platform for generating an analog signal indicative of the force exerted on said platform by said collection of articles;
 A-to-D conversion means for receiving said analog signal, and converting same to a digital signal indicative of said force, and thereby of the number of articles in said collection;
 means for generating and storing a digital signal indicative of the tare weight acting at said load cell;
 means for subtracting said signal indicative of the said tare weight from said digital signal indicative of the number of articles in said collection, to thereby normalize said latter digital signal;
 means for generating and storing a digital signal indicative of the weight per unit article of a predetermined size group of said articles;
 means for dividing said normalized digital signal by said stored weight per unit value to determine the said number of articles;
 means for displaying the thereby determined number of said articles; and
 wherein said A-to-D conversion means comprises a ramp comparator means for generating a ramp signal and comparing said analog signal from said load cell means with said ramp signal; clock means for generating time-ordered pulses; gating means connected to said ramp comparator means and said clock means, for outputing said clock pulses while the level of said analog signal exceeds said ramp signal; binary counter means for receiving said outputed pulses from said gating means; and means for counting the overflows from said counter means to provide indication of the total number of pulses gated to said counter, and thereby indication of the digital value of said analog signal.

12. Apparatus in accordance with claim 11, including means connected to said gating means for generating a further overflow from said counter means upon said ramp signal level equaling the level of said analog signal, and for generating a further sequence of pulses corresponding to the difference between the overflow capacity of said counter and the counter reading at said signal equalization, for enabling subtraction of said further sequence of pulses from the digital number of said clock pulses corresponding to the total said overflows, to thereby adjust said digital number corresponding to said total overflows to reflect the reading of said counter at said signal equalization point for said ramp and analog signals.

* * * * *